US011055473B2

(12) United States Patent
Feng (10) Patent No.: US 11,055,473 B2
(45) Date of Patent: Jul. 6, 2021

(54) DYNAMIC MESSAGE DISPLAY METHOD, SERVER, AND TERMINAL

(71) Applicant: TENCENT TECHNOLOGY (SHENZHEN) COMPANY LIMITED, Shenzhen (CN)

(72) Inventor: Yanshan Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 310 days.

(21) Appl. No.: 15/728,363

(22) Filed: Oct. 9, 2017

(65) Prior Publication Data

US 2018/0032484 A1 Feb. 1, 2018

Related U.S. Application Data

(63) Continuation of application No. PCT/CN2016/082553, filed on May 18, 2016.

(30) Foreign Application Priority Data

Aug. 5, 2015 (CN) .......................... 201510474543.1

(51) Int. Cl.
*G06Q 50/00* (2012.01)
*G06F 40/106* (2020.01)
(Continued)

(52) U.S. Cl.
CPC .......... *G06F 40/106* (2020.01); *G06F 3/0481* (2013.01); *G06Q 50/01* (2013.01);
(Continued)

(58) Field of Classification Search
CPC .... G06F 17/212; G06F 3/0481; G06F 40/106; G06F 3/0488; G06Q 50/01; H04L 51/04; H04L 51/046; H04L 51/16; H04L 51/32
See application file for complete search history.

(56) References Cited

U.S. PATENT DOCUMENTS 6,781,608 B1\* 8/2004 Crawford ................ H04L 51/04
715/753
2010/0268830 A1\* 10/2010 McKee .................. G06Q 10/10
709/228
(Continued)

FOREIGN PATENT DOCUMENTS

CN 102024028 A 4/2011
CN 102236678 A 11/2011
(Continued)

OTHER PUBLICATIONS

The World Intellectual Property Organization (WIPO) International Search Report for PCT/CN2016/082553 dated Jul. 27, 2016 5 Pages (including translation).

(Continued)

*Primary Examiner* — Beau D Spratt
(74) *Attorney, Agent, or Firm* — Anova Law Group, PLLC (57) ABSTRACT

A method for displaying dynamic messages includes: obtaining a set of friend dynamic messages of a first user of a terminal; obtaining interaction response information of friend dynamic messages in the set of friend dynamic messages, and calculating display parameters corresponding to the friend dynamic messages based on the interaction response information; and sending the display parameters to the terminal, so that the terminal displays the friend dynamic message in the set of friend dynamic messages according to the display parameters.

18 Claims, 8 Drawing Sheets

(51) Int. Cl.
*H04L 12/58* (2006.01)
*G06F 3/0481* (2013.01)
*G06F 3/0488* (2013.01)

(52) U.S. Cl.
CPC ............ *H04L 51/04* (2013.01); *H04L 51/046* (2013.01); *H04L 51/16* (2013.01); *H04L 51/32* (2013.01); *G06F 3/0488* (2013.01)

(56) References Cited

U.S. PATENT DOCUMENTS

| | | | | |
|---|---|---|---|---|
| 2012/0005224 A1* | 1/2012 | Ahrens | ............... | H04W 4/21 707/769 |
| 2012/0078917 A1* | 3/2012 | Gradin | ............... | G06F 16/23 707/748 |
| 2012/0278725 A1* | 11/2012 | Gordon | ............ | H04N 21/25891 715/738 |
| 2013/0007018 A1* | 1/2013 | Chen | ............... | G06Q 10/10 707/748 |
| 2014/0279283 A1* | 9/2014 | Budaraju | ............... | G06Q 50/01 705/27.1 |
| 2016/0035002 A1* | 2/2016 | Kim | ............... | G06Q 30/0631 705/26.7 |
| 2016/0105387 A1* | 4/2016 | Jackson | ............... | H04W 4/21 709/206 |

FOREIGN PATENT DOCUMENTS

| | | |
|---|---|---|
| CN | 102316130 A | 1/2012 |
| CN | 102682039 A | 9/2012 |
| CN | 102880643 A | 1/2013 |
| CN | 105119809 A | 12/2015 |
| WO | 2009088671 A1 | 7/2009 |

OTHER PUBLICATIONS

The State Intellectual Property Office of the People's Republic of China (SIPO) Office Action 1 for 201510474543.1 dated Sep. 5, 2017 5 Pages (including translation).

* cited by examiner

DYNAMIC MESSAGE DISPLAY METHOD, SERVER, AND TERMINAL

RELATED APPLICATIONS

This application is a continuation application of PCT Patent Application No. PCT/CN2016/082553, filed on May 18, 2016, which claims priority to China Patent Application No. 201510474543.1, filed with the Chinese Patent Office on Aug. 5, 2015 and entitled "DYNAMIC MESSAGE DISPLAY METHOD, SERVER, AND TERMINAL", entire contents of both of which is incorporated herein by reference in its entirety.

FIELD OF THE TECHNOLOGY

The present disclosure relates to the field of security technologies and, in particular, to a method for displaying dynamic messages, and a server and a terminal thereof.

BACKGROUND OF THE DISCLOSURE

With the development of computer technologies, more and more people communicate with each other and obtain various dynamic information by means of network applications, such as browsing real-time news from micro-blogs or obtaining friend information using social-network applications. However, with increase in the number of friends and amount of posted information, it is difficult to find high-value information in a large amount of information.

In existing applications, all dynamic messages posted by all users is displayed equally. When a user browses the dynamic messages, the user cannot quickly browse valuable messages or messages posted by friends from a selected group through grouping and screening. Such screening and displaying is not based on the message itself, and it is still not convenient to view high-value messages.

SUMMARY

According to various embodiments disclosed in this application, a dynamic message display method, a server, and a terminal are provided.

A method for displaying dynamic messages includes: obtaining a set of friend dynamic messages of a first user of a terminal; obtaining interaction response information of friend dynamic messages in the set of friend dynamic messages, and calculating display parameters corresponding to the friend dynamic messages based on the interaction response information; and sending the display parameters to the terminal, so that the terminal displays the friend dynamic message in the set of friend dynamic messages according to the display parameters.

A server includes a storage storing instructions and a processor coupled to the storage. When executing the instructions, the processor is configured for: obtaining a set of friend dynamic messages of a first user of a terminal; obtaining interaction response information of friend dynamic messages in the set of friend dynamic messages, and calculating display parameters corresponding to the friend dynamic messages based on the interaction response information; and sending the display parameters to the terminal to cause the terminal to display the friend dynamic messages in the set of friend dynamic messages according to the display parameters.

A method for displaying dynamic messages for a terminal includes: receiving, by a first terminal, interaction response information sent by a server, the interaction response information being corresponding to friend dynamic messages in a set of friend dynamic messages of a first user on the first terminal; calculating, by the first terminal, display parameters corresponding to the friend dynamic messages according to the interaction response information; and displaying, by the first terminal, the friend dynamic messages in the set of friend dynamic messages according to the display parameters.

Details of one or more embodiments of the present invention are proposed in the following accompanying drawings and descriptions. Other features, objectives, and advantages of the present disclosure become obvious in the specification, the accompanying drawings, and the claims.

BRIEF DESCRIPTION OF THE DRAWINGS

To describe the technical solutions in the embodiments of the present invention more clearly, the following briefly introduces the accompanying drawings. Apparently, the accompanying drawings in the following description merely show some embodiments of the present invention, and a person of ordinary skill in the art may derive other drawings from these accompanying drawings without creative efforts.

DESCRIPTION OF EMBODIMENTS

Figure 1:
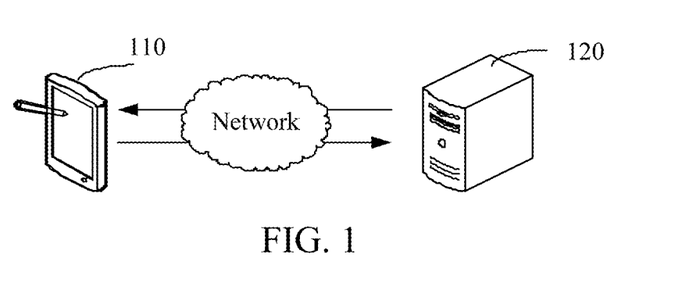
FIG. 1 is a diagram of an application environment of a method for displaying dynamic messages according to an embodiment.

FIG. 1 is a diagram of an application environment in which a dynamic message display method runs according to disclosed embodiments. As shown in FIG. 1, the application environment includes a terminal 110 and a server 120. The terminal 110 and the server 120 communicate with each other by using a network.

The terminal 110 may be a smartphone, a tablet computer, a laptop computer, a desktop computer, or the like, but is not limited thereto. The terminal 110 sends a dynamic message viewing request to the server 120 by using the network, and the server 120 may respond to the request sent by the terminal 110.

Figure 2:
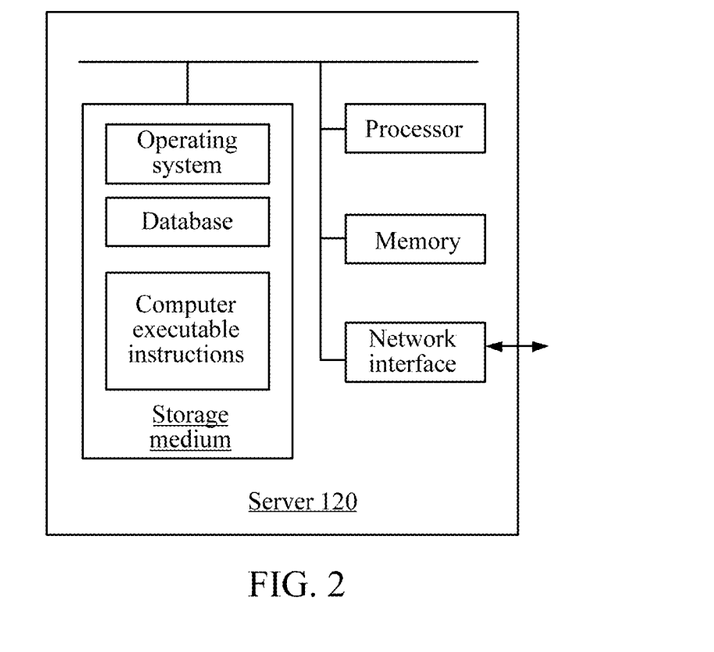
FIG. 2 is an internal structural diagram of a server according to an embodiment.

In an embodiment, an internal structure of the server 120 in FIG. 1 is shown in FIG. 2. The server 120 includes a processor, a storage medium, a memory, and a network interface, all of which may be connected by using a system bus. A storage medium of the server 120 stores an operating system, a database, and computer executable instructions. The database is configured to store data. The instructions, when executed by the processor, can implement a method for displaying dynamic message applicable to the server 120. The processor of the server 120 is configured to: provide a calculation and control capability and support running of the entire server 120. The memory of the server 120 provides an environment to running of the computer executable instructions in the storage medium. The network interface of the server 120 is configured to connect to and communicate with the external terminal 110 by using a network, for example, to receive a request sent by the terminal 110 and return data to the terminal 110.

Figure 3:
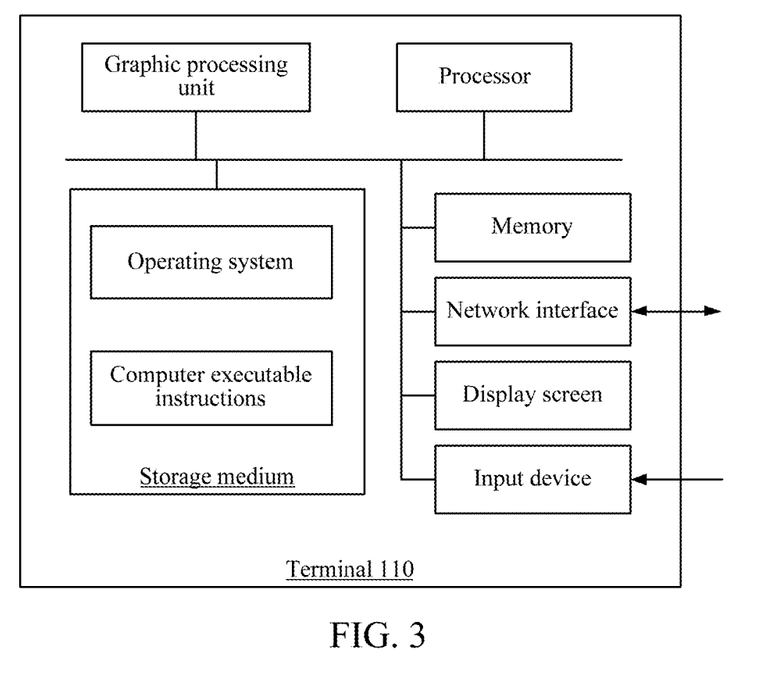
FIG. 3 is an internal structural diagram of a terminal according to an embodiment.

In an embodiment, an internal structure of the terminal 110 in FIG. 1 is shown in FIG. 3. The terminal 110 includes a processor, a graphic processing unit, a storage medium, a memory, a network interface, a display screen, and an input device, all of which may be connected by using a system bus. The storage medium of the terminal 110 stores an operating system and further includes computer executable instructions. The instructions, when executed by the processor, can implement a method for displaying dynamic message applicable to the terminal 110.

The processor is configured to provide a calculation and control capability and support running of the entire terminal 110. A graphic processing unit in the terminal 110 is configured to provide at least a drawing capability of a display interface. The memory provides an environment to running of the computer executable instructions in the storage medium. The network interface is configured to perform network communication with the server 120, for example, to receive interaction response information sent by the server. The display screen is configured to display a web page interface, for example, to display friend dynamic message. The input device is configured to receive a command or data input by a user. For the terminal 110 with a touchscreen, the display screen and the input device may be touchscreens.

Figure 4:
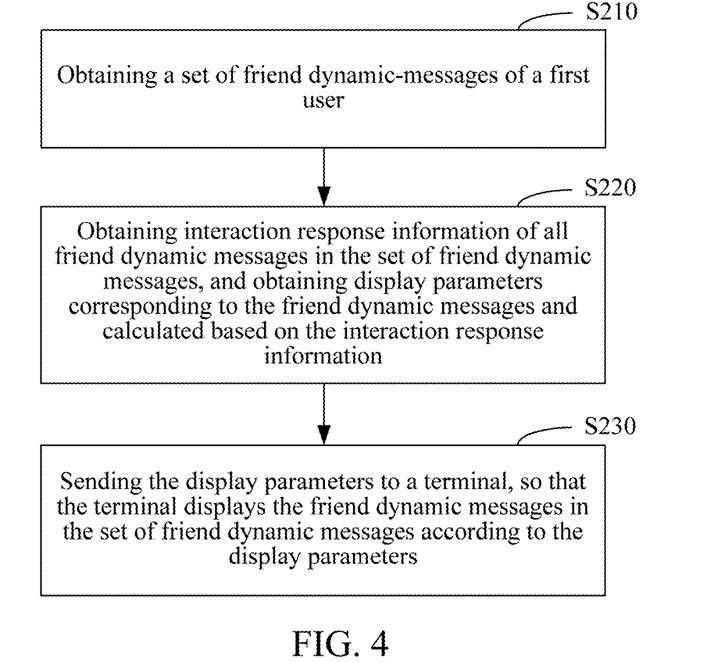
FIG. 4 is a flowchart of a method for displaying dynamic messages according to an embodiment.

As shown in FIG. 4, in an embodiment, a method for displaying dynamic message is provided, using a server applied to the foregoing application environment as an example for description. The dynamic message display method may include the followings.

S210: Obtaining a set of friend dynamic-messages of a first user.

Specifically, the first user refers to a current user logging in on a first terminal. Friends of the current user refer to contacts that the current user adds or follows. Messages posted by a friend of the first user are friend dynamic messages, including text messages, picture messages, video messages, and the like, and the friend dynamic messages are dynamically updated in real time. The number of the friend dynamic messages in the set of friend dynamic messages may be set according to actual requirements. In an embodiment, friend dynamic messages posted within a preset time period are obtained to form the set of friend dynamic messages. The preset time period may be self-defined according to requirements and may be defined as a time period with a preset length counting back from the time point when the message-viewing request from the first terminal is received.

Using a social-network application as an example, the time point is set at when the first user refreshes his social circle. For example, if the first user refreshes his social circle at 21:00, the preset time period refers to the time of several hours before 21:00, such as 18:00-21:00. Alternatively, the preset time period may be defined as a time period of a preset length before and/or after a time point when the friend dynamic message is posted. Because the first user may have multiple friends, and each friend may post multiple dynamic messages, the set of friend dynamic messages may include dynamic messages of multiple friends. It can be understood that, when display parameters corresponding to dynamic messages of each friend are calculated, different friend dynamic message sets within different preset time periods may be separately obtained.

S220: Obtaining interaction response information of all friend dynamic messages in the set of friend dynamic messages, and obtaining display parameters corresponding to the friend dynamic messages and calculated based on the interaction response information.

Specifically, each friend dynamic message may include corresponding interaction response information. The interaction response information refers to information generated by interaction operation performed by a friend of the user posting the friend dynamic message, such as opening information (e.g., the number of opening operation) generated by opening and browsing the friend dynamic message, or the like information generated by liking operation on the friend dynamic message, etc. The friend dynamic message may include multiple types of interaction response information. After the interaction response information is obtained, the interaction response information may be converted into different values, and the values are calculated according to a preset algorithm to obtain a calculation result. The display parameters are obtained according to a correspondence relationship between the calculation result and the display parameters, or the calculation result is directly used as the display parameters.

For example, if the number of opening operation of a friend dynamic message is 2, the number of likes is 1, and the number of comments is 1, the display parameter can be obtained by adding together the number of opening operation, the number of likes, and the number of comments, which is 4. Each display parameter has a preset corresponding display format used for controlling the display state, such as color, transparency, magnitude, and whether dynamical display, etc. Different interaction response information may obtain different display parameters by calculation.

The interaction response information represents an attention degree of the friend dynamic messages, and a message with a large attention degree is usually a high-value message. A friend dynamic message with a large attention degree can be provided with a display parameter that can attract users' attention, such as amplifying and flashing the dynamic message, etc. On the other hand, a friend dynamic message with a small attention degree can be provided with a display parameter that reduces users' attention, such as increasing fuzziness and gray display, etc. The friend dynamic message with a small attention degree is probably advertisements or junk information. By increasing a display difference between the message with a small attention degree and a valuable message, junk information can be effectively identified, and harassment of junk information to a user can be reduced. It can be understood that when the friend dynamic message is just posted, a display parameter of dynamic message of each friend is the same. Only when the interaction response information changes along with time, the interaction response information corresponds to different display parameters.

S230: Sending the display parameters to a terminal, so that the terminal displays the friend dynamic messages in the set of friend dynamic messages according to the display parameters.

Specifically, the display parameters are sent to the terminal, and the terminal can obtain display formats, such as a display magnitude of the friend dynamic message, a color, brightness, a fuzziness degree, whether to display in a collapsible manner, and whether to display in a dynamic and shaking manner, etc., for each friend dynamic message in the set of friend dynamic messages according to the display parameters.

In the embodiments, a set of friend dynamic messages of a first user is obtained; interaction response information of friend dynamic messages in the set of friend dynamic messages is obtained, and display parameters corresponding to the friend dynamic messages are calculated according to the interaction response information; and the display parameters are sent to a terminal, so that the terminal displays the friend dynamic messages in the set of friend dynamic messages according to the display parameters. The interaction response information represents an attention degree of the corresponding friend dynamic message; a message with a large attention degree is usually a high-value message; the display parameters are calculated by using the interaction response information, so that the display of friend dynamic messages is associated with the value of the messages to certain extent. Thus, the display of junk information differs from that of valuable information, thereby effectively identifying junk information, reducing harassment of junk information to a user, and improving convenience of viewing high-value messages by a user.

Figure 5:
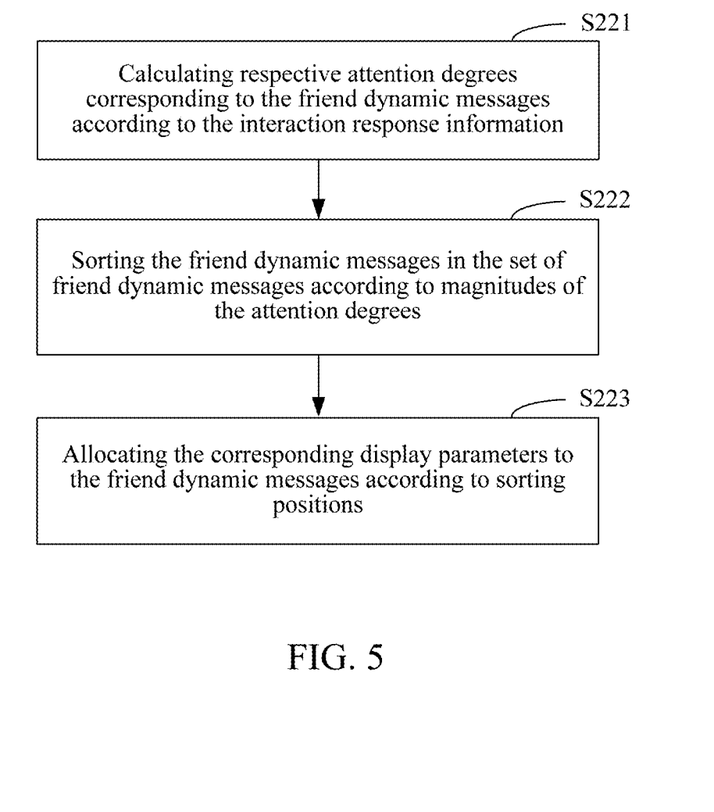
FIG. 5 is a flowchart of calculating display parameters based on interaction response information according to an embodiment.

In an embodiment, as shown in FIG. 5, calculating display parameters corresponding to the friend dynamic messages according to the interaction response information includes the followings.

S221: Calculating respective attention degrees corresponding to the friend dynamic messages according to the interaction response information.

Specifically, the corresponding interaction response information may include multiple types. The interaction response information of each type is also updated in real time, such as the number of opening operation, the number of likes, the number of comments, and the character length of the comment, etc. Each type of interaction response information may be set with different weights. For example, a weight of the number of opening operation is 0.5, a weight of the number of likes is 1, a weight of the number of comments is 2, and a weight of the character length of the comment is 0.5. Then, the values of each type are weighted and added together to obtain a final calculation result as the attention degree. The specific algorithm may be automatically set according to actual requirements.

S222: Sorting the friend dynamic messages in the set of friend dynamic messages according to magnitudes of the attention degrees.

Specifically, friend dynamic messages are sorted according to magnitudes of the attention degrees, for example, in a descending order. A higher attention degree indicates being ranked more ahead. It can be understood that, after sorting the friend dynamic messages, the server may also send the sorting result to the terminal. The terminal allocates the corresponding display parameters according to the sorting result.

S223: Allocating the corresponding display parameters to the friend dynamic messages according to sorting positions.

Specifically, because values of the attention degrees of the dynamic messages may be greatly different from each other. If the display parameters are directly allocated according to the values of the attention degrees, the display difference may be excessively great. Thus, the attention degrees are first sorted according to their magnitudes and, then, the corresponding display parameters are allocated based on the sorted sequence, where different sorting positions correspond to different display parameters. Thus, the differences between the display parameters are uniform or controllable, more suitable for human eye's visual senses. In an embodiment, the sequence, after all friend dynamic messages are sorted, is divided into a plurality of segments, and each segment corresponds to a different display parameter. Thus, there is no need to allocate a different display parameter to every friend dynamic message, making the method more simple and convenient.

In an embodiment, the display parameter includes a fuzziness degree. Specifically, different fuzziness degrees are allocated according to the interaction response information. For a friend dynamic message corresponding to interaction response information including a large number of interaction and/or a large number of comments, a small fuzziness degree is allocated and the display is relatively clear. For a friend dynamic message corresponding to interaction response information including a small number of interaction, a large fuzziness degree is allocated and the display is relatively fuzzy. Thus, friend dynamic messages can be clearly distinguished by using fuzziness degrees, so that a user views valuable information. In an embodiment, different fuzziness degrees are allocated according to the sorting positions of the friend dynamic messages. For example, if a ranking position is 0, a fuzziness degree is 0, and the friend dynamic message is clearly displayed. If a ranking position is 1, a fuzziness degree is 1, and so on.

In an embodiment, the interaction response information includes at least one of opening information, liking information, and comment information, and the opening information, the liking information, and the comment information each has corresponding weights.

Specifically, the opening information includes the number of opening and viewing of the friend dynamic message, the liking information includes the number of likes, and the comment information includes the number of comments, character length of the comment, and the like. Different kind of information corresponds to different preset weights, so as to calculate a calculation result more suitable for the value of information and to allocate the display parameters according to the calculation result.

Figure 6:
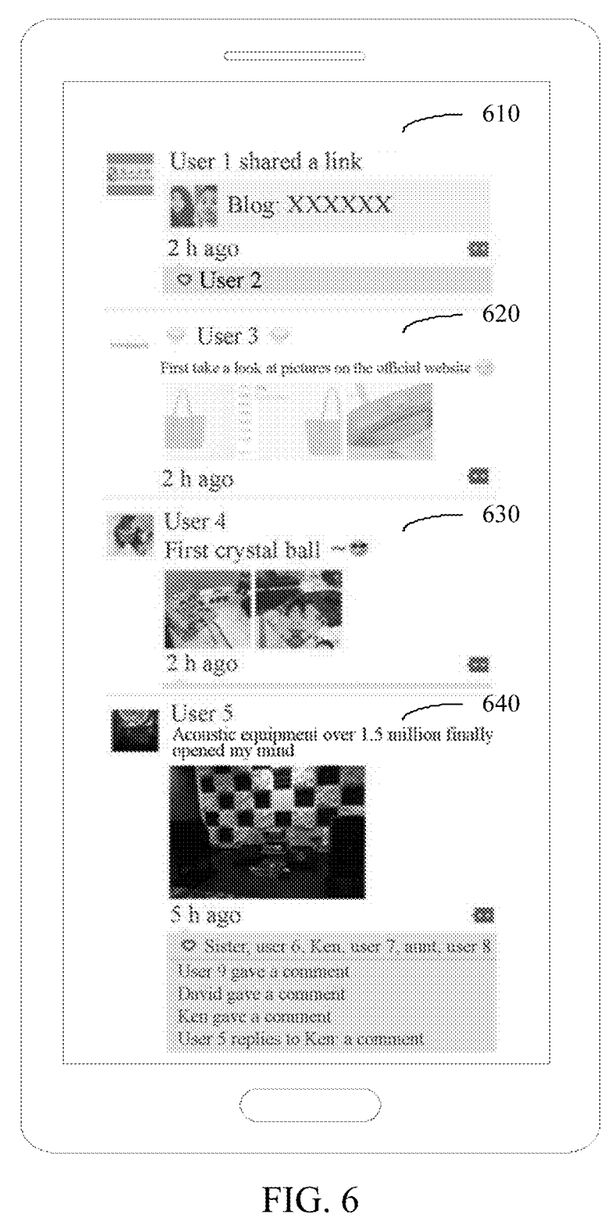
FIG. 6 is a schematic diagram of displaying friend dynamic messages according to an embodiment.

FIG. 6 is a schematic diagram of displaying friend dynamic messages according to fuzziness degrees. As shown in FIG. 6, friend dynamic message 610, friend dynamic message 620, friend dynamic message 630, and friend dynamic message 640 are displayed on a terminal. Other messages may also be included.

Further, the weight for the number of opening X is 0.5, the weight for the number of likes Y is 1, and the weight of the number of comments is 1, and the formula for calculating the attention degree A is: $A = X \times 0.5 + Y \times 1 + Z \times 1$. Thus, the attention degree of friend dynamic message 610 is 2.5, the attention degree of friend dynamic message 620 is 0.5, the attention degree of friend dynamic message 630 is 4.5, and the attention degree of friend dynamic message 640 is 12. The friend dynamic messages are then sorted in a descending order, and the sorted sequence is sequentially the friend dynamic message 640, the friend dynamic message 630, the friend dynamic message 610, and the friend dynamic message 620. The corresponding fuzziness degrees 0, 1, 2, and 3 are sequentially obtained according to ranking. Thus, the friend dynamic message 640 has a fuzziness degree 0 and is the clearest, and the friend dynamic message 620 has a fuzziness degree 3 and is the fuzziest.

In an embodiment, after obtaining interaction response information of friend dynamic messages in the set of friend dynamic messages, the method further includes: determining whether an operating user corresponding to the interaction response information of the friend dynamic message is a friend of the first user, filtering the interaction response information if the operating user is not a friend of the first user, and keeping the interaction response information if the operating user is a friend of the first user.

Specifically, a second user is a friend of the first user, the friend dynamic message is posted by the second user, and the operating user of the interaction response information of the posted friend dynamic message is a friend of the second user. The friend of the second user may be a friend of the first user, or the friend of the second user may not be a friend of the first user. If the operating user corresponding to the interaction response information is a friend of the first user, the friend dynamic message may cause discussion of the first user, and more likely, is information to which the first user pays attention. Therefore, the interaction response information is kept. If the operating user corresponding to the interaction response information is not a friend of the first user, the interaction response information has a relatively low attention degree for the first user, or the first user may not see the interaction response information. Therefore, the interaction response information is ineffective interaction response information and is filtered. Thus, by screening the interaction response information according to the friend relationship, the display parameters calculated according to the interaction response information are more suitable for the value of information.

Figure 7:
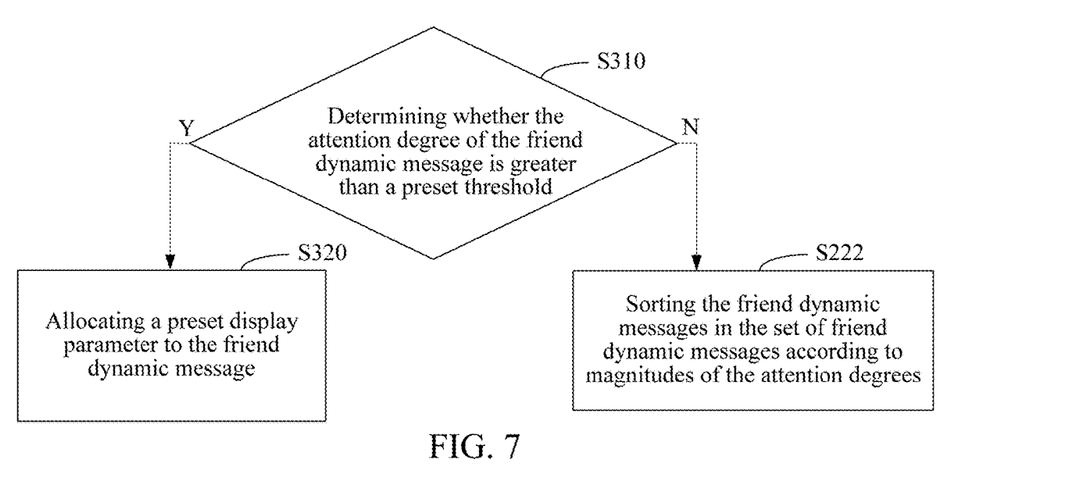
FIG. 7 is a flowchart of obtaining display parameters in different cases based on attention degrees according to an embodiment.

In an embodiment, as shown in FIG. 7, before S222, the method further includes the followings.

S310: Determining whether the attention degree of the friend dynamic message is greater than a preset threshold; performing S320 if the attention degree is greater than the preset threshold; and performing S222 if the attention degree is not greater than the preset threshold.

S320: Allocating a preset display parameter to the friend dynamic message.

Specifically, if the attention degree of the friend dynamic message is greater than the preset threshold, it indicates that the friend dynamic message is valuable information. A same preset display parameter is allocated to the friend dynamic message whose attention degree is greater than the preset threshold, and the friend dynamic message does not need to be sorted, thereby improving the calculation speed of the display parameters. For example, it can be defined that the fuzziness degrees of friend dynamic messages whose attention degrees are greater than 5 are all 0, such that these friend dynamic messages can be clearly displayed.

In an embodiment, the method may further include: if the attention degree of a friend dynamic message does not satisfy a preset condition within a second preset time period, adding a collapsible display parameter for the friend dynamic message, where the collapsible display parameter is used for hiding the friend dynamic message.

Specifically, the preset condition may be self-defined. For example, if the attention degree cannot reach the preset threshold within the second preset time period, the preset condition is not met, and the collapsible display parameter is added. The specific value of the collapsible display parameter is determined according to the friend dynamic message, and the collapsible display parameter may include a hidden ratio, for example, being partially or entirely hidden. During display at the terminal, the terminal hides the friend dynamic message according to the collapsible display parameter.

Figure 8:
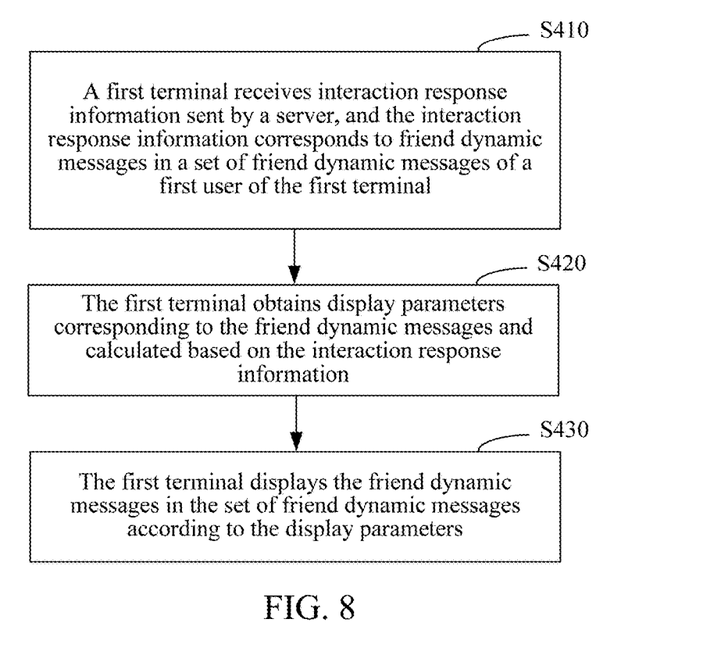
FIG. 8 is a flowchart of another method for displaying dynamic messages according to an embodiment.

The present disclosure also provides a method for displaying dynamic messages using a terminal applied to the foregoing application environment, as an example for descriptions. As shown in FIG. 8, the method includes the followings.

S410: A first terminal receives interaction response information sent by a server, and the interaction response information corresponds to friend dynamic messages in a set of friend dynamic messages of a first user of the first terminal.

Specifically, the first user refers to a current user logging in on the first terminal. Friends of the current user refer to contacts that the current user adds or follows. Messages posted by friends of the first user are friend dynamic messages, including text messages, picture messages, video messages, and the like, and the friend dynamic messages are dynamically updated in real time. The number of the friend dynamic messages in the set of friend dynamic messages may be set according to actual requirements. In an embodiment, friend dynamic messages posted within a preset time period are obtained to form the set of friend dynamic messages. The preset time period may be self-defined according to requirements and may be defined as a time period with a preset length counting back from the time point when the message-viewing request from the first terminal is received.

Using a social-network application as an example, the time point is set at when the first user refreshes his social circle. For example, if the first user refreshes his social circle at 21:00, the preset time period refers to the time of several hours before 21:00, such as 18:00-21:00. Alternatively, the preset time period may be defined as a time period of a preset length before and/or after a time point when the friend dynamic message is posted. Because the first user may have multiple friends, and each friend may post multiple dynamic messages, the set of friend dynamic messages may include dynamic messages of multiple friends. It can be understood that, when display parameters corresponding to dynamic messages of each friend are calculated, different friend dynamic message sets within different preset time periods may be separately obtained.

Further, each friend dynamic message may include corresponding interaction response information. The interaction response information refers to information generated by interaction operation performed by a friend of the user posting the friend dynamic message, such as opening information (e.g., the number of opening operation) generated by opening and browsing the friend dynamic message, or the like information generated by liking operation on the friend dynamic message, etc. The friend dynamic message may include multiple types of interaction response information.

S420: The first terminal obtains display parameters corresponding to the friend dynamic messages and calculated based on the interaction response information.

Specifically, after the interaction response information is obtained, the interaction response information may be converted into different values, and the values are calculated according to a preset algorithm to obtain a calculation result. The display parameters are obtained according to a correspondence relationship between the calculation result and the display parameters, or the calculation result is directly used as the display parameters.

For example, if the number of opening operation of a friend dynamic message is 2, the number of likes is 1, and the number of comments is 1, the display parameter can be obtained by adding together the number of opening operation, the number of likes, and the number of comments, which is 4. Each display parameter has a preset corresponding display format used for controlling the display state, such as color, transparency, magnitude, and whether dynamical display, etc. Different interaction response information may obtain different display parameters by calculation.

The interaction response information represents an attention degree of the friend dynamic messages, and a message with a large attention degree is usually a high-value message. A friend dynamic message with a large attention degree can be provided with a display parameter that can attract users' attention, such as amplifying and flashing the dynamic message, etc. On the other hand, a friend dynamic message with a small attention degree can be provided with a display parameter that reduces users' attention, such as increasing fuzziness and gray display, etc. The friend dynamic message with a small attention degree is probably advertisements or junk information. By increasing a display difference between the message with a small attention degree and a valuable message, junk information can be effectively identified, and harassment of junk information to a user can be reduced. It can be understood that when the friend dynamic message is just posted, a display parameter of dynamic message of each friend is the same. Only when the interaction response information changes along with time, the interaction response information corresponds to different display parameters.

S430: The first terminal displays the friend dynamic messages in the set of friend dynamic messages according to the display parameters.

Specifically, the first terminal obtains display formats, such as a display magnitude of the friend dynamic message, a color, brightness, a fuzziness degree, whether to display in a collapsible manner, and whether to display in a dynamic and shaking manner, etc., for each friend dynamic message in the set of friend dynamic messages according to the display parameters. The first terminal also displays the friend dynamic messages according to the display formats. In an embodiment, the display parameters include the fuzziness degree.

In the embodiments, a first terminal receives interaction response information sent by a server, and the interaction response information corresponds to friend dynamic messages in a set of friend dynamic messages of a first user on the first terminal. The display parameters corresponding to the friend dynamic messages are calculated according to the interaction response information; and the display parameters are sent to a terminal, so that the terminal displays the friend dynamic messages in the set of friend dynamic messages according to the display parameters. The interaction response information represents an attention degree of the corresponding friend dynamic message; a message with a large attention degree is usually a high-value message; the display parameters are calculated by using the interaction response information, so that the display of friend dynamic messages is associated with the value of the messages to certain extent. Thus, the display of junk information differs from that of valuable information, thereby effectively identifying junk information, reducing harassment of junk information to a user, and improving convenience of viewing high-value messages by a user.

Figure 9:
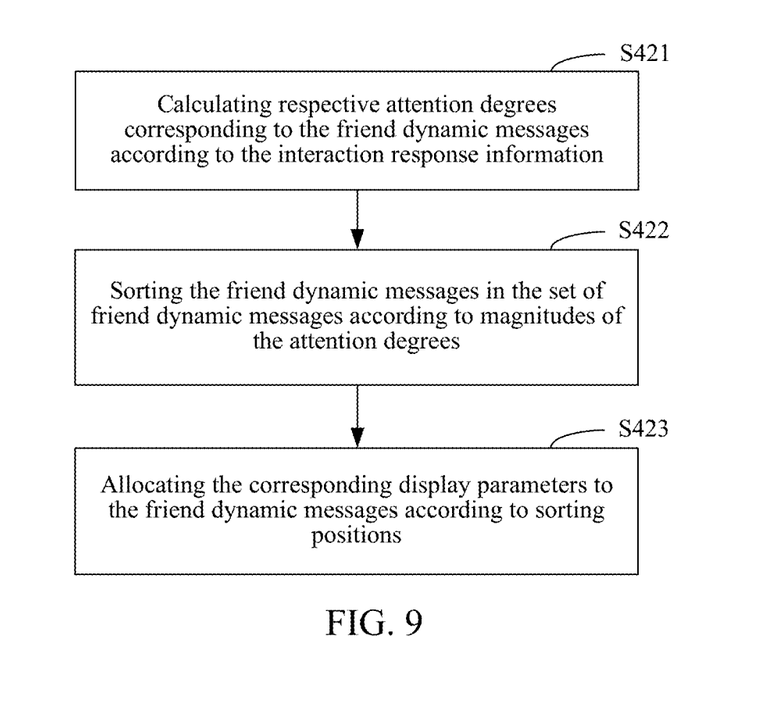
FIG. 9 is a flowchart of calculating display parameters based on interaction response information according to an embodiment.

In an embodiment, as shown in FIG. 9, S420 includes the followings.

S421: Calculating respective attention degrees corresponding to the friend dynamic messages according to the interaction response information.

Specifically, the corresponding interaction response information may include multiple types. The interaction response information of each type is also updated in real time, such as the number of opening operation, the number of likes, the number of comments, and the character length of the comment, etc. Each type of interaction response information may be set with different weights. For example, a weight of the number of opening operation is 0.5, a weight of the number of likes is 1, a weight of the number of comments is 2, and a weight of the character length of the comment is 0.5. Then, the values of each type are weighted and added together to obtain a final calculation result as the attention degree. The specific algorithm may be automatically set according to actual requirements.

S422: Sorting the friend dynamic messages in the set of friend dynamic messages according to magnitudes of the attention degrees.

Specifically, friend dynamic messages are sorted according to magnitudes of the attention degrees, for example, in a descending order. A higher attention degree indicates being ranked more ahead. It can be understood that, after sorting the friend dynamic messages, the server may also send the sorting result to the terminal. The terminal allocates the corresponding display parameters according to the sorting result.

S423: Allocating the corresponding display parameters to the friend dynamic messages according to sorting positions.

Specifically, because values of the attention degrees of the dynamic messages may be greatly different from each other. If the display parameters are directly allocated according to the values of the attention degrees, the display difference may be excessively great. Thus, the attention degrees are first sorted according to their magnitudes and, then, the corresponding display parameters are allocated based on the sorted sequence, where different sorting positions correspond to different display parameters. Thus, the differences between the display parameters are uniform or controllable, more suitable for human eye's visual senses. In an embodiment, the sequence, after all friend dynamic messages are sorted, is divided into a plurality of segments, and each segment corresponds to a different display parameter. Thus, there is no need to allocate a different display parameter to every friend dynamic message, making the method more simple and convenient.

In an embodiment, the interaction response information includes at least one of opening information, liking information, and comment information, and the opening information, the liking information, and the comment information each has corresponding weights.

In an embodiment, the interaction response information includes at least one of opening information, liking information, and comment information, and the opening information, the liking information, and the comment information correspond to preset weights.

In an embodiment, before S422, the method further includes: determining whether the attention degree of the friend dynamic message is greater than a preset threshold, and allocating a preset display parameter to the friend dynamic message if the attention degrees are greater than the preset threshold; if the attention degree is not greater than the preset threshold, the friend dynamic message is sorted together with other friend dynamic messages according to magnitudes of the attention degrees.

In an embodiment, the method may further include: if the attention degree of a friend dynamic message does not satisfy a preset condition within a second preset time period, adding a collapsible display parameter for the friend dynamic message, where the collapsible display parameter is used for hiding the friend dynamic message.

Figure 10:
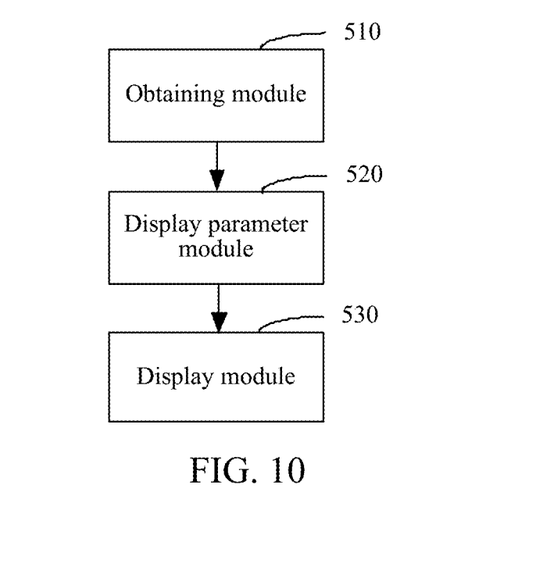
FIG. 10 is a block diagram of a server according to an embodiment.

In certain embodiments, a server is provided and includes a storage and a processor. The storage storing instructions, and processor executes the instructions to implement various modules and units achieving the dynamic message display. As shown in FIG. 10, the server may include an obtaining module 510, a display parameter module 520, and a display module 530, etc.

The obtaining module 510 is configured to obtain a set of friend dynamic messages of a first user; the display parameter module 520 is configured to: obtain interaction response information of friend dynamic messages in the set of friend dynamic messages, and obtain display parameters corresponding to the friend dynamic messages and calculated according to the interaction response information; and the display module 530 is configured to send the display parameters to a terminal, so that the terminal displays friend dynamic messages in the set of friend dynamic messages according to the display parameters.

Figure 11:
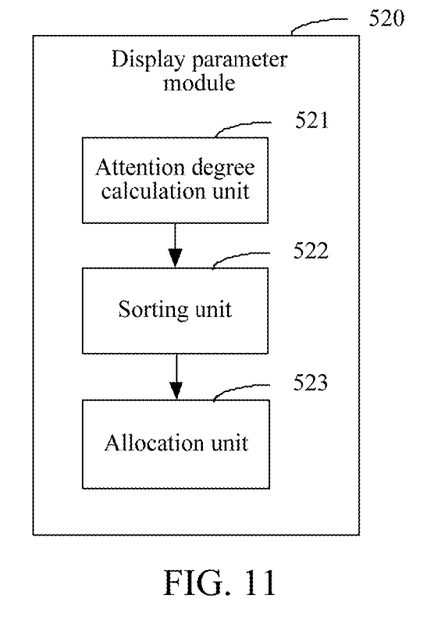
FIG. 11 is a block diagram of a display parameter module according to an embodiment.

In an embodiment, as shown in FIG. 11, the display parameter module 520 includes an attention degree calculation unit 521, a sorting unit 522, and an allocation unit 523, etc. The attention degree calculation unit 521 is configured to obtain attention degrees corresponding to the friend dynamic messages and calculated according to the interaction response information; the sorting unit 522 is configured to sort the friend dynamic messages according to magnitudes of the attention degrees; and the allocation unit 523 is configured to allocate corresponding display parameters to the friend dynamic messages according to sorting positions.

In an embodiment, the display parameters include fuzziness degrees.

In an embodiment, the interaction response information includes at least one of opening information, liking information, and comment information, and the opening information, the liking information, and the comment information correspond to preset weights.

In an embodiment, the display parameter module 520 is further configured to: determine whether an operating user corresponding to the interaction response information of the friend dynamic message is a friend of the first user, filter the interaction response information if the operating user is not a friend of the first user, and keep the interaction response information if the operating user is a friend of the first user.

Figure 12:
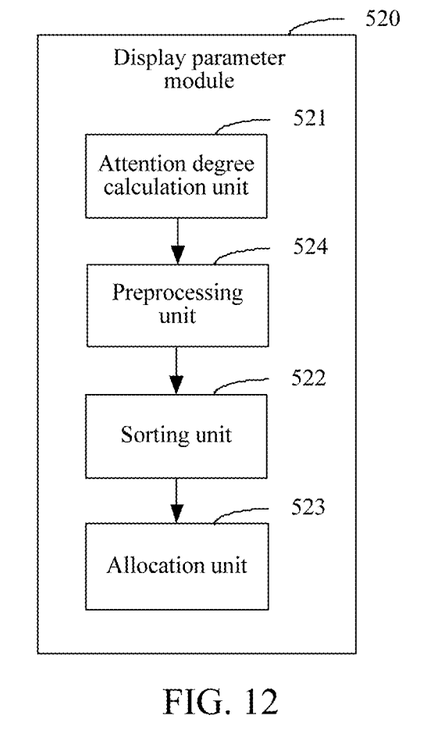
FIG. 12 is a block diagram of a display parameter module according to another embodiment.

In an embodiment, as shown in FIG. 12, the display parameter module 520 further includes a preprocessing unit 524, which is configured to determine whether the attention degrees of the friend dynamic message are greater than a preset threshold, and allocate a preset display parameter to the friend dynamic message if the attention degrees are greater than the preset threshold. If the attention degrees are not greater than the preset threshold, the sorting unit 522 is used to sort such friend dynamic messages.

Figure 13:
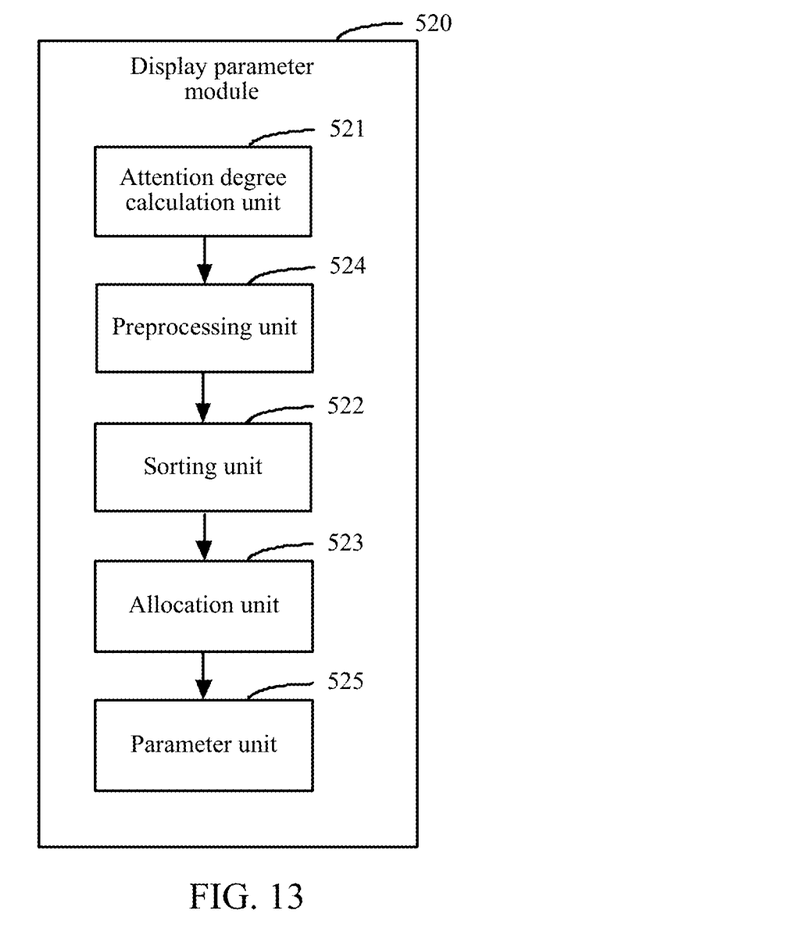
FIG. 13 is a block diagram of a display parameter module according to another embodiment.

In an embodiment, as shown in FIG. 13, the display parameter module 520 further includes a parameter unit 525, which is configured to add a collapsible display parameter if the attention degree of the friend dynamic message does not satisfy a preset condition within a second preset time, where the collapsible display parameter is used for hiding the friend dynamic message.

In an embodiment, a terminal is provided and includes a storage and a processor, the storage storing instructions, and the instructions, when executed by the processor, causing the processor to perform the following process: receiving interaction response information sent by a server, the interaction response information corresponding to friend dynamic messages in a set of friend dynamic messages of a first user on the terminal; calculating display parameters corresponding to the friend dynamic messages according to the interaction response information; and displaying the friend dynamic message in the set of friend dynamic messages according to the display parameters.

In an embodiment, calculating display parameters corresponding to the friend dynamic messages according to the interaction response information includes: calculating attention degrees corresponding to the friend dynamic messages according to the interaction response information; sorting the friend dynamic messages according to magnitudes of the attention degrees; and allocating the corresponding display parameters to the friend dynamic messages according to sorting positions.

In an embodiment, the display parameters include a fuzziness degree.

In an embodiment, the interaction response information includes at least one of opening information, liking information, and comment information, and the opening information, the liking information, and the comment information have respective preset weights.

In an embodiment, the instructions, when executed by the processor, further cause the processor to perform the following steps: determining whether the attention degrees of the friend dynamic message are greater than a preset threshold, and allocating a preset display parameter to the friend dynamic message if the attention degrees are greater than the preset threshold; and sorting the friend dynamic messages according to magnitudes of the attention degrees if the attention degrees are not greater than the preset threshold.

In an embodiment, the processor is further configured for: adding a collapsible display parameter if the attention degrees of the friend dynamic message do not satisfy a preset condition within a second preset time, where the collapsible display parameter is used for hiding the friend dynamic message.

In an embodiment, one or more non-volatile computer storage media storing computer executable instructions are provided, and the computer executable instructions, when executed by one or more processors, cause the one or more processors to perform the following process: obtaining a set of friend dynamic messages of a first user; obtaining interaction response information of friend dynamic messages in the set of friend dynamic messages, and calculating display parameters corresponding to the friend dynamic messages according to the interaction response information; and sending the display parameters to a terminal, so that the terminal displays friend dynamic message in the set of friend dynamic messages according to the display parameters.

In an embodiment, one or more non-volatile computer storage media storing computer executable instructions are provided, and the computer executable instructions, when executed by one or more processors, cause the one or more processors to perform the following process: receiving interaction response information sent by a server, the interaction response information being corresponding to friend dynamic message in a set of friend dynamic messages of a first user corresponding to the terminal; calculating display parameters corresponding to the friend dynamic messages according to the interaction response information; and displaying the friend dynamic message in the set of friend dynamic messages according to the display parameters.

A person of ordinary skill in the art can understand that the whole process or a part of the process in the foregoing embodiment methods can be completed by instructing relevant hardware by using a computer program. The program may be stored in a computer readable storage medium. When being executed, the program may implement processes of the embodiments of the foregoing methods. The storage medium may be a nonvolatile storage medium such as a magnetic disk, an optical disc, and a read-only memory (Read-Only Memory, ROM), or a random-access memory (Random Access Memory, RAM).

The technical features in the foregoing embodiments can be randomly combined. For concise descriptions, not all possible combinations of the technical features in the foregoing embodiments are described. However, as long as the combinations of these technical features are not contradictory, the combinations should all be regarded as within the scope disclosed in the specification.

The foregoing embodiments only describe several implementation manners of the present disclosure, and their description is specific and detailed, but cannot therefore be understood as a limitation to the scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A method for displaying dynamic messages, comprising:
    obtaining a set of friend dynamic messages of a first user of a terminal;
    obtaining interaction response information of the set of friend dynamic messages, wherein the interaction response information includes, directed to each of the set of friend dynamic messages, a numeral number of opening clicks (X), a numeral number of likes (Y), and a numeral number of comments (Z), wherein the set of friend dynamic messages is obtained by:
        collecting a dynamic message posted by a second user and an interaction operation performed by a friend of the second user, the second user being a friend of the first user;
        determining whether the friend of the second user is also a friend of the first user;
        in response to determining the friend of the second user is not also the friend of the first user, excluding the dynamic message posted by the second user from the set of friend dynamic messages; and
        in response to determining the friend of the second user is also the friend of the first user, including the dynamic message posted by the second user in the set of friend dynamic messages;
    calculating display parameters corresponding to the set of friend dynamic messages based on the interaction response information, wherein the numeral number of opening operations (X) is assigned a first weight (W1), the numeral number of likes (Y) is assigned a second weight (W2), and the numeral number of comments (Z) is assigned a third weight (W3), wherein each of the display parameters is a function based on a multiplication of X and W1, a multiplication of Y and W2, and a multiplication of Z and W3, and wherein the display parameters are calculated further by:
        calculating attention degrees corresponding to the set of friend dynamic messages according to the interaction response information;
        sorting the set of friend dynamic messages according to the attention degrees as calculated; and
        allocating the display parameters to the set of friend dynamic messages as sorted;
    sorting the display parameters in a descending order; and
    displaying the set of friend dynamic messages according to the display parameters in the descending order.

2. The method according to claim 1, further comprising:
    obtaining fuzziness degrees sorted in an ascending order; and
    displaying the set of friend dynamic messages along with the display parameters in the descending order and the fuzziness degrees in the ascending order.

3. The method according to claim 1, before sorting the friend dynamic messages according to the attention degrees as calculated, the method further comprising:
    determining whether the attention degrees of the friend dynamic messages are greater than a preset threshold, and allocating a preset display parameter to any friend dynamic messages with attention degrees greater than the preset threshold; and
    sorting those friend dynamic messages with attention degrees not greater than the preset threshold according to magnitudes of the attention degrees.

4. The method according to claim 1, further comprising:
    in response to determining the attention degree of the dynamic message does not satisfy a preset condition within a second preset time length, adding a collapsible display parameter for the dynamic message, wherein the collapsible display parameter is used for hiding the dynamic message.

5. The method according to claim 1, wherein at least one of the second weight W2 and the third weight W3 is greater in value than the first weight W1.

6. The method according to claim 1, further comprising:
    updating at least one of the first, second, and third weights to obtain at least one of updated first, second, and third weights; and
    obtaining updated displaying parameters based on the updated first, second, and third weights.

7. A server, comprising: a storage storing instructions; and a processor coupled to the storage and, when executing the instructions, configured for:
    obtaining a set of friend dynamic messages of a first user of a terminal;
    obtaining interaction response information of the set of friend dynamic messages, wherein the interaction response information includes, directed to each of the set of friend dynamic messages, a numeral number of opening clicks (X), a numeral number of likes (Y), and a numeral number of comments (Z), wherein the set of friend dynamic messages is obtained by:
        collecting a dynamic message posted by a second user and an interaction operation performed by a friend of the second user, the second user being a friend of the first user;
        determining whether the friend of the second user is also a friend of the first user;
        in response to determining the friend of the second user is not also the friend of the first user, excluding the dynamic message posted by the second user from the set of friend dynamic messages; and in response to determining the friend of the second user is also the friend of the first user, including the dynamic message posted by the second user in the set of friend dynamic messages;

calculating display parameters corresponding to the set of friend dynamic messages based on the interaction response information, wherein the numeral number of opening operations (X) is assigned a first weight (W1), the numeral number of likes (Y) is assigned a second weight (W2), and the numeral number of comments (Z) is assigned a third weight (W3), wherein each of the display parameters is a function based on a multiplication of X and W1, a multiplication of Y and W2, and a multiplication of Z and W3, and wherein the display parameters are calculated further by:

calculating attention degrees corresponding to the set of friend dynamic messages according to the interaction response information;

sorting the set of friend dynamic messages according to the attention degrees as calculated; and allocating the display parameters to the set of friend dynamic messages as sorted;

sorting the display parameters in a descending order; and displaying the set of friend dynamic messages according to the display parameters in the descending order.

8. The server according to claim 7, further comprising:
obtaining fuzziness degrees sorted in an ascending order; and displaying the set of friend dynamic messages along with the display parameters in the descending order and the fuzziness degrees in the ascending order.

9. The server according to claim 7, wherein the processor is further configured for:

determining whether the attention degrees of the friend dynamic messages are greater than a preset threshold, and allocating a preset display parameter to any friend dynamic messages with attention degrees greater than the preset threshold; and sorting those friend dynamic messages with attention degrees not greater than the preset threshold according to magnitudes of the attention degrees.

10. The server according to claim 7, wherein the processor is further configured for:

in response to determining the attention degree of the dynamic message does not satisfy a preset condition within a second preset time length, adding a collapsible display parameter for the dynamic message, wherein the collapsible display parameter is used for hiding the dynamic message.

11. The server according to claim 7, wherein at least one of the second weight W2 and the third weight W3 is greater in value than the first weight W1.

12. The server according to claim 7, wherein the processor is configured to further perform:

updating at least one of the first, second, and third weights to obtain at least one of updated first, second, and third weights; and obtaining updated displaying parameters based on the updated first, second, and third weights.

13. A non-transitory computer-readable storage medium storing computer program instructions executable by at least one processor to perform:

obtaining a set of friend dynamic messages of a first user of a terminal;

obtaining interaction response information of the set of friend dynamic messages, wherein the interaction response information includes, directed to each of the set of friend dynamic messages, a numeral number of opening clicks (X), a numeral number of likes (Y), and a numeral number of comments (Z), wherein the set of friend dynamic messages is obtained by:

collecting a dynamic message posted by a second user and an interaction operation performed by a friend of the second user, the second user being a friend of the first user;

determining whether the friend of the second user is also a friend of the first user;

in response to determining the friend of the second user is not also the friend of the first user, excluding the dynamic message posted by the second user from the set of friend dynamic messages; and in response to determining the friend of the second user is also the friend of the first user, including the dynamic message posted by the second user in the set of friend dynamic messages;

calculating display parameters corresponding to the set of friend dynamic messages based on the interaction response information, wherein the numeral number of opening operations (X) is assigned a first weight (W1), the numeral number of likes (Y) is assigned a second weight (W2), and the numeral number of comments (Z) is assigned a third weight (W3), wherein each of the display parameters is a function based on a multiplication of X and W1, a multiplication of Y and W2, and a multiplication of Z and W3, and wherein the display parameters are calculated further by:

calculating attention degrees corresponding to the set of friend dynamic messages according to the interaction response information;

sorting the set of friend dynamic messages according to the attention degrees as calculated; and allocating the display parameters to the set of friend dynamic messages as sorted;

sorting the display parameters in a descending order; and displaying the set of friend dynamic messages according to the display parameters in the descending order.

14. The non-transitory computer-readable storage medium according to claim 13, wherein the computer program instructions are executable by the at least one processor to further perform:

obtaining fuzziness degrees sorted in an ascending order; and displaying the set of friend dynamic messages along with the display parameters in the descending order and the fuzziness degrees in the ascending order.

15. The non-transitory computer-readable storage medium according to claim 13, wherein the computer program instructions are executable by the at least one processor to further perform:

determining whether the attention degrees of the friend dynamic messages are greater than a preset threshold, and allocating a preset display parameter to any friend dynamic messages with attention degrees greater than the preset threshold; and sorting those friend dynamic messages with attention degrees not greater than the preset threshold according to magnitudes of the attention degrees.

16. The non-transitory computer-readable storage medium according to claim 13, wherein the computer program instructions are executable by the at least one processor to further perform:

in response to determining the attention degree of the dynamic message does not satisfy a preset condition within a second preset time length, adding a collapsible display parameter for the dynamic message, wherein the collapsible display parameter is used for hiding the dynamic message.

17. The non-transitory computer-readable storage medium according to claim 13, wherein at least one of the second weight W2 and the third weight W3 is greater in value than the first weight W1.

18. The non-transitory computer-readable storage medium according to claim 13, wherein the computer program instructions are executable by the at least one processor to further perform:
  updating at least one of the first, second, and third weights to obtain at least one of updated first, second, and third weights; and
  obtaining updated displaying parameters based on the updated first, second, and third weights.

* * * * *